Jan. 12, 1971   B. A. BUGAENKO ET AL   3,554,053
TWO-STAGE REDUCING GEAR FOR ANCHOR CHAIN ARRESTERS
Filed Dec. 13, 1968

United States Patent Office 3,554,053
Patented Jan. 12, 1971

3,554,053
TWO-STAGE REDUCING GEAR FOR
ANCHOR CHAIN ARRESTERS
Boris Andreevich Bugaenko, Prospekt Lenina 30, kv. 32;
Georgy Ivanovich Vladinets, Prospekt Lenina 30, kv. 13; and Jury Filippovich Yantser, Ul. Belaya 13, kv. 37, all of Nikolaev, U.S.S.R.
Filed Dec. 13, 1968, Ser. No. 783,548
Int. Cl. F16h 1/22, 1/40
U.S. Cl. 74—626
10 Claims

ABSTRACT OF THE DISCLOSURE

A two-stage reducing gear for anchor chain arresters the first stage of which is a worm pair, and second stage of which is a differential. One of the differential center wheels, connected to the hand drive, is provided with a second set of teeth for engaging a cylindrical toothed rack, or a worm, having a longitudinal recess for disengaging it from the second set of teeth of said wheel. A spring-loaded shaft, carrying the rack or worm, is so supported that it can axially travel over a certain distance, the rack or worm being loaded with a torsion spring. A pick-up, registering the movement of the shaft, is located at one of the ends thereof, said pick-up producing a signal to disengage the drive of the reducing gear after the shaft has travelled over a required distance.

---

The present invention relates to marine deck machinery and more particularly to a two-stage reducing gear for anchor chain arresters.

The present invention can also be used for windless band brakes.

Known in the prior art are reducing gears for marine machinery with a planetary gear, the pinion carrier of said gear being connected to an electric motor. One center wheel is connected to the output shaft, and a second center wheel is in mesh with a cylindrical toothed rack, which prevents the rotation of said wheel. The toothed rack takes the reactive force from the second center wheel.

When the hand drive is switched on, the toothed rack is disengaged from the center wheel by turning it relative to the longitudinal axis to the position in which the wheel teeth will coincide with a longitudinal recess of the rack. When the drive is brought over from manual control to remote control, the toothed rack does not always engage with the center wheel, as the rack teeth do not always coincide with the teeth spaces of the wheel. In this case it is necessary to turn the wheel through a certain angle manually, which is not permissible in friction drives, where even a negligible turning of the output shaft results in a reduction of the friction force that holds down the link.

An object of the present invention is to provide a two-stage reducing gear for an anchor chain arrester, which is relatively simple in design and ensures reliable engagement of the rack with the abovesaid wheel when changing from manual control to remote control, as well as an automatic switching off of the drive when a required torque is achieved on the output shaft of the reducing gear.

This object is achieved by providing a two-stage reducing gear for an anchor chain arrester, the first stage of which is essentially a worm pair, and the second stage a differential, one of the center wheels of the differential, connected to the hand drive, being provided with a second set of teeth for engaging the cylindrical toothed rack, having a longitudinal recess for being disengaged from the second set of teeth of said wheel. According to the invention, the shaft, carrying the rack, is capable of a certain axial travel, and is also spring-loaded; the rack is loaded with a torsion spring; a shaft motion pick-up is installed at one of the ends of said shaft, said pick-up producing a signal to switch off the drive of the reducing gear after the shaft has travelled through a required distance.

This design of the reducing gear ensures the engagement between the teeth of the worm or rack and the set of teeth of the differential wheel without turning the latter, which is of special importance for friction-type reducing gears.

Moreover, the drive of the reducing gear is switched off automatically when a required torque is attained on the output shaft of the reducing gear.

Given below is a description of an exemplary embodiment of the invention with reference to the accompanying drawings, wherein.

Figure 1:
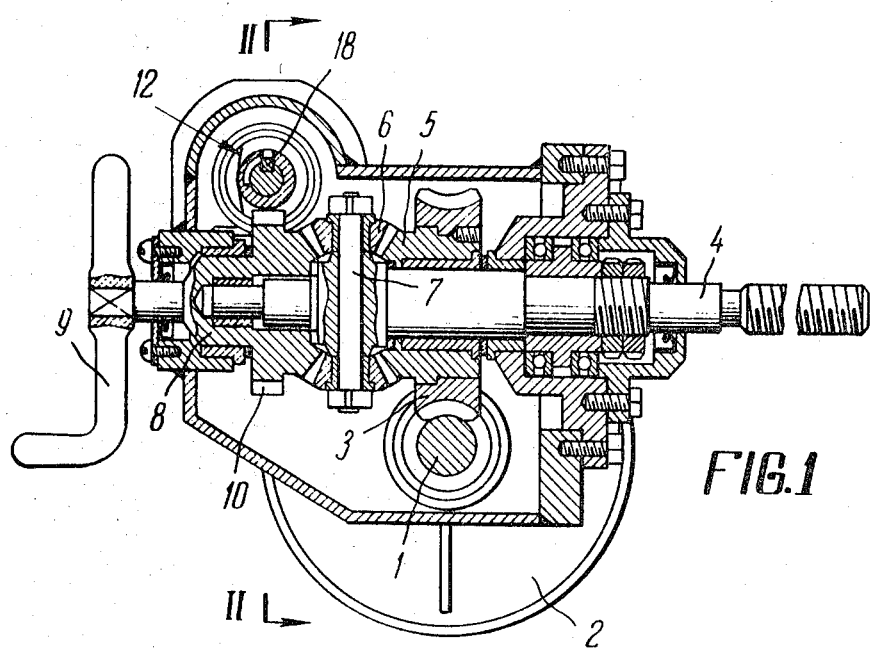
FIG. 1 shows a longitudinal section of the two-stage reducing gear according to the invention, for an anchor chain arrester.

The first stage of the reducing gear for the anchor chain arrester is a worm stage, wherein a worm 1 (FIG. 1) is operatively associated with drive 2 of the reducing gear.

Rigidly connected to a worm wheel 3 is a center wheel 5 of a differential, said wheel 5 being in engagement with satellites 6, fitted on a shaft 7, which is located in the opening of the output shaft 4 disposed normally to said shaft.

The satellites 6 are also in engagement with a second center wheel 8 of the differential, thus forming the second stage. The shank of the wheel 8 is rigidly connected to the handle of a hand drive 9.

Figure 2:
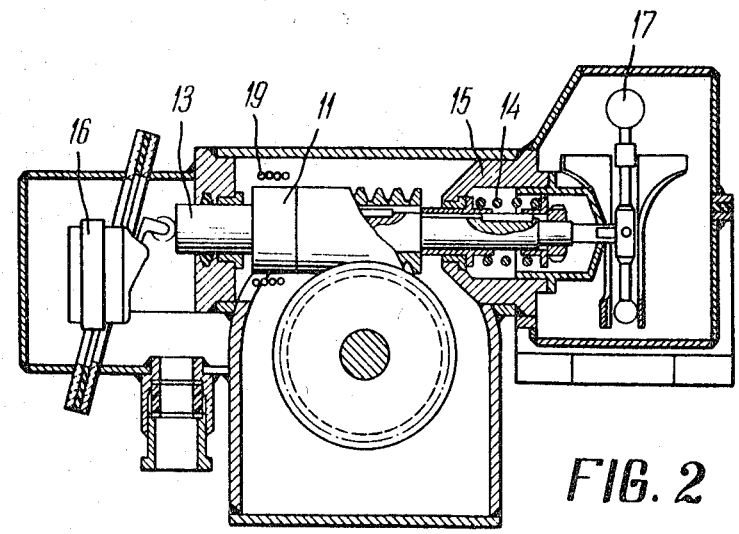
FIG. 2 shows a section, taken along the line II—II of FIG. 1.

The center wheel 8 has an additional cylindrical set of teeth 10, which is in mesh with a cylindrical set of teeth of rack 11 (FIG. 2), having a longitudinal recess 12.

When the drive 2 of the reducing gear is switched on, the satellites 6 are set in motion via the worm stage and the wheel 5 of the differential. Said satellites rotate the output shaft 4 while revolving around the conical set of teeth of the center wheel 8, braked by the teeth of the rack 11.

When the anchor chain is gripped by the arrester (the arrester and anchor chain are not shown in the drawing) the shaft 4 stops rotating.

The reactive torque is transmitted to the cylindrical set of teeth of rack 11 as an axial force from the drive 2 of the reducing gear by the cylindrical set of teeth of rack 11. This force is transmitted to casting 15 of the reducing gear via the rack 11, shaft 13 and compression spring 14. When the torque on the output shaft 4 reaches the value ensuring reliable gripping of the chain by the arresters, the reactive torque on the teeth 10 and, consequently, the axial force on the rack 11 reaches the value, ensuring compression of the spring 14 and movement of the shaft 13, which causes the pick-up 16 to operate, said pick-up being a limit switch and producing a signal to disengage the drive 2.

For changing over to the manual control, the handle 17, articulated to the shaft 13, should be turned through 180° and fixed in position. In this case dowel 18 (FIG. 1) of the shaft 13 moves along the dowel groove in the rack 11 through 90° to a stop.

Then the dowel 18 turns the rack 11 through 90° by bearing against the end of the dowel groove, and disengages it from the set of teeth 10. The torsion spring 19 is thus loaded.

The torque is transmitted to the output shaft 4 by turning the handle 9 of the hand drive via the wheel 8 and satellites 6, interacting with the conical set of teeth of the wheel 5.

In order to connect the reducing gear to the drive 2 it is necessary to return the handle 17 into the initial position to fix same.

When the teeth of the rack 11 do not coincide with the tooth spaces of the teeth 10, it is necessary by means of the handle 17 to move the shaft 13, and, hence, the rack 11 along its longitudinal axis until the rack 11 is engaged with the teeth 10 under the action of the torsion spring 19. It is obvious, that a worm provided with a longitudinal recess can be used instead of the cylindrical rack 11.

The test model of the reducing gear is designed for transmitting the torque of up to 4.5 kg., the speed of rotation of the output shaft being 95 r.p.m. In this case the power of the electric motor driving the reducing gear is 0.7 kw., the speed of rotation being 2820 r.p.m.

What we claim is:

1. A two stage reducing gear for anchor chain arresters comprising a casing, a worm and worm wheel rotatably supported in said casing, means for driving said worm, said worm and worm wheel constituting a first stage of the reducing gear, a differential constituting a second stage of the reducing gear, said differential including a pair of spaced center wheels, one of said center wheels including a set of teeth and being fixed to said worm wheel, the other of said center wheels including two independent sets of teeth, a hand drive connected to the other of said center wheels, gear means interposed between said center wheels and being meshed with the set of teeth of said one center wheel and with one set of teeth of the other of said center wheels, a cylindrical rack including teeth in mesh with the other set of teeth of the other of said center wheels, said rack being provided with a longitudinally disposed recess, turning means connected to said rack for turning said recess in said rack opposite said other set of teeth of the other of said center wheels to disengage the rack from the latter wheel, said turning means including a shaft spring-loaded axially and connected to said rack, means supporting said shaft for allowing said shaft to be moved axially over a prescribed distance, a torsion spring including one end connected to said casing and another end connected to said rack, and a pick-up coupled with said means for driving said worm for registering the axial movement of said shaft, said pick-up being supported axially opposite one end of said shaft to be engaged thereby, said pick-up producing a signal to deactivate the means for driving the worm after the shaft has moved axially over said prescribed distance.

2. A two stage reducing gear as claimed in claim 1, wherein said turning means further comprises a handle and a dowel connected to said shaft, said rack being provided with an arcuate dowel groove terminating in a stop, said dowel, upon turning said handle, being movable arcuately in said groove to engage said stop to turn said rack.

3. A two stage reducing gear as claimed in claim 2 wherein said dowel groove extends arcuately over 90°.

4. A two stage reducing gear as claimed in claim 3 wherein said rack upon being turned 90° is disengaged from the other of said center wheels.

5. A two stage reducing gear as claimed in claim 4 wherein said handle is turned 180° to disengage the rack from the other of said center wheels.

6. A two stage reducing gear as claimed in claim 5, wherein each of said center wheels are supported about a common axis of rotation, and said gear means is supported about an axis of rotation transversely disposed relative to said common axis of rotation of said center wheels.

7. A two-stage reducing gear as claimed in claim 6, including an output shaft, said worm wheel being rotatably supported freely on said output shaft.

8. A two-stage reducing gear as claimed in claim 7, wherein the other of said center wheels is rotatably supported freely on said output shaft.

9. A two-stage reducing gear as claimed in claim 8, wherein the other of said center wheels includes a hub portion axially projecting from said casing, said hand drive being connected to said hub portion externally of said casing for rotation about an axis common to that of said output shaft.

10. A two-stage reducing gear as claimed in claim 7, wherein said worm wheel and said one center wheel are both annular, said one center wheel being fixedly connected to said worm wheel internally thereof and being rotatably supported freely on said output shaft.

References Cited

UNITED STATES PATENTS

| | | | |
|---|---|---|---|
| 1,948,709 | 2/1934 | Hackethal | 74—626 |
| 2,005,891 | 6/1935 | Elberty, Jr. | 74—675 |
| 2,028,696 | 1/1936 | Beckwith | 74—626 |
| 2,086,030 | 7/1937 | Hodgson et al. | 74—626 |
| 2,300,343 | 10/1942 | Clay | 74—675 |
| 2,621,544 | 12/1952 | Rossmann | 74—626 |
| 2,955,486 | 10/1960 | Bacchi | 74—626 |

FRED C. MATTERN, JR., Primary Examiner

W. S. RATLIFF, JR., Assistant Examiner

U.S. Cl. X.R.

74—675